United States Patent
Espy et al.

(10) Patent No.: US 12,216,133 B2
(45) Date of Patent: Feb. 4, 2025

(54) SAMPLE HANDLING SYSTEM FOR HANDLING A PLURALITY OF SAMPLES

(71) Applicant: Roche Diagnostics Operations, Inc., Indianapolis, IN (US)

(72) Inventors: Christopher Espy, Remseck (DE); Yin Cai, Munich (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 938 days.

(21) Appl. No.: 17/218,638

(22) Filed: Mar. 31, 2021

(65) Prior Publication Data

US 2021/0311083 A1    Oct. 7, 2021

(30) Foreign Application Priority Data

Apr. 2, 2020   (EP) ..................................... 20167765

(51) Int. Cl.
*B01L 3/00*    (2006.01)
*B01F 23/00*   (2022.01)
(Continued)

(52) U.S. Cl.
CPC ... *G01N 35/00732* (2013.01); *G06K 7/10297* (2013.01); *G06K 7/10366* (2013.01);
(Continued)

(58) Field of Classification Search
CPC ... G01N 35/00732; G01N 2035/00752; G01N 2035/00851; G01N 35/02;
(Continued)

(56) References Cited

U.S. PATENT DOCUMENTS 9,598,243 B2    3/2017  Denninger et al.
9,625,481 B2    4/2017  Mellars et al.
(Continued)

FOREIGN PATENT DOCUMENTS

EP    3070479 A1    9/2016
EP    3273251 A1    1/2018
(Continued)

OTHER PUBLICATIONS

Azad, Abul K. M. and Misbahuddin, Mohammed, Web-Based Object Tracking Using Collaborated Camera Network, Advances in Internet of Things, 2018, pp. 13-25, vol. 8, No. 2.
(Continued)

*Primary Examiner* — Jennifer Wecker
*Assistant Examiner* — Oyeleye Alexander Alabi
(74) *Attorney, Agent, or Firm* — Woodard, Emhardt, Henry, Reeves & Wagner, LLP

(57) ABSTRACT

A sample handling system for handling samples is disclosed. The sample handling system comprises sample holders, each receives a sample container; a sample transport device for moving the sample holders; a control unit for controlling functionality of the sample handling system, and a monitoring system for monitoring the samples during movement. The monitoring system comprises a camera module for continuously capturing images of a part of the sample transport device, wherein the camera module is at a distance from the sample transport device such that the camera module has a free field of view to the sample transport device, and a processor for processing the captured images and determining an item of information about the sample transport device and/or the sample container and/or the sample from the captured images. The control unit retrieves the item of information from the processor. The controlling is based on the retrieved item of information.

25 Claims, 6 Drawing Sheets

(51) Int. Cl.

| | | |
|---|---|---|
| *B01F 23/41* | (2022.01) | |
| *B01F 101/23* | (2022.01) | |
| *B23Q 17/24* | (2006.01) | |
| *C07K 14/705* | (2006.01) | |
| *C12M 1/34* | (2006.01) | |
| *C12Q 1/04* | (2006.01) | |
| *C12Q 1/18* | (2006.01) | |
| *C12Q 1/686* | (2018.01) | |
| *G01N 21/3577* | (2014.01) | |
| *G01N 21/359* | (2014.01) | |
| *G01N 21/39* | (2006.01) | |
| *G01N 21/45* | (2006.01) | |
| *G01N 21/64* | (2006.01) | |
| *G01N 21/77* | (2006.01) | |
| *G01N 21/78* | (2006.01) | |
| *G01N 27/414* | (2006.01) | |
| *G01N 30/12* | (2006.01) | |
| *G01N 30/68* | (2006.01) | |
| *G01N 30/70* | (2006.01) | |
| *G01N 30/72* | (2006.01) | |
| *G01N 30/88* | (2006.01) | |
| *G01N 33/00* | (2006.01) | |
| *G01N 33/18* | (2006.01) | |
| *G01N 33/50* | (2006.01) | |
| *G01N 33/53* | (2006.01) | |
| *G01N 33/543* | (2006.01) | |
| *G01N 33/68* | (2006.01) | |
| *G01N 33/74* | (2006.01) | |
| *G01N 35/00* | (2006.01) | |
| *G01N 35/10* | (2006.01) | |
| *G06K 7/10* | (2006.01) | |
| *G06K 7/14* | (2006.01) | |
| *G06K 19/06* | (2006.01) | |
| *G06K 19/07* | (2006.01) | |
| *G06T 7/00* | (2017.01) | |
| *G06T 7/90* | (2017.01) | |
| *H10K 10/46* | (2023.01) | |
| *H10K 85/00* | (2023.01) | |
| *H10K 85/20* | (2023.01) | |

(52) U.S. Cl.
CPC ......... *G06K 7/1413* (2013.01); *G06K 7/1417* (2013.01); *G06K 19/06028* (2013.01); *G06K 19/06037* (2013.01); *G06K 19/0723* (2013.01); *G01N 2035/00752* (2013.01); *G01N 2035/00851* (2013.01)

(58) Field of Classification Search
CPC .......... G01N 2035/00831; G01N 2035/00881; G01N 2035/0493; G01N 35/00584; G06K 7/10297; G06K 7/10366; G06K 7/1413; G06K 7/1417; G06K 19/06028; G06K 19/06037; G06K 19/0723; B07C 5/3412; B07C 5/3422; B65G 2201/0244; B65G 2201/0261; B65G 2203/0208; B65G 2203/0216; B65G 2203/0241; B65G 2203/0291; B65G 43/08; B65G 2203/025; B65G 47/493; B65G 2203/041; H04N 7/183

See application file for complete search history.

(56) References Cited

U.S. PATENT DOCUMENTS

| | | |
|---|---|---|
| 9,804,181 B2 | 10/2017 | German et al. |
| 2015/0177268 A1 | 6/2015 | Reisch et al. |
| 2016/0011224 A1 | 1/2016 | Pollack |

FOREIGN PATENT DOCUMENTS

| | | | |
|---|---|---|---|
| JP | 2001-283197 A | 10/2001 | |
| JP | 2003-083718 A | 3/2003 | |
| JP | 2005-063036 A | 3/2005 | |
| JP | 2019-211921 A | 12/2019 | |
| WO | 2003/040991 A2 | 5/2003 | |
| WO | 2007/035943 A2 | 3/2007 | |
| WO | 2013/070744 A2 | 5/2013 | |
| WO | WO-2013170204 A1 * | 11/2013 | ............ A61B 19/52 |
| WO | 2014/059134 A1 | 4/2014 | |
| WO | 2018/022280 A1 | 2/2018 | |
| WO | 2019/013960 A1 | 1/2019 | |
| WO | WO 2019158732 | 8/2019 | |

OTHER PUBLICATIONS

European Search Report issued Oct. 16, 2020, in Application No. 20167765.5, 1 p.

Karaca, Hüseyin N. and Akinlar, Cüneyt, A Multi-camera Vision System for Real-Time Tracking of Parcels Moving on a Conveyor Belt, Computer and Information Science, 2005, pp. 708-717.

Korshunov, Pavel and Ooi, Wei Tsang, Reducing Frame Rate for Object Tracking, Advances in Multimedia Modeling, 2010, pp. 454-464.

* cited by examiner

SAMPLE HANDLING SYSTEM FOR HANDLING A PLURALITY OF SAMPLES

CROSS-REFERENCE TO RELATED APPLICATIONS

This application claims priority to EP 20167765.5, filed Apr. 2, 2020, which is hereby incorporated by reference.

BACKGROUND

The present disclosure generally relates to a sample handling system and a method for handling a plurality of samples.

In the field of medical or chemical laboratories, generally a plurality of samples, for example liquid samples, have to be handled automatically. Therefore, many automation systems may comprise monitoring the traffic of the samples to be handled in the system. As an example, an automation system for an in vitro diagnostics environment can include a plurality of intelligent carriers that include onboard processing and navigation capabilities. The intelligent carriers can include one or more image sensors to observe the relative motion of the track as the carrier traverses it. The carriers can also observe position marks on the track surface to provide absolute position information, which can include additional data, such as routing instructions. Synchronization marks may be provided to correct errors in the observed trajectory. However, shortcomings of this approach may be the following. As the optical sensors are located on the carrier and watch the track, there is no live monitoring of the sample container in the carrier. Moreover, position markings have to be encoded and applied to the track. Only single carriers are tracked and monitoring of the entire traffic in the system is not.

Known methods and devices are typically used for monitoring large vehicles and do not monitor the condition of the contents of the vehicles. Moreover, the camera monitoring always focuses on single sample holders. This may cause a low parallelization of the technology. In view of small camera field, gapless monitoring is not possible. For gapless monitoring of movement of sample holders, a very high number of cameras need to be installed, meaning very high cost.

Therefore, there is a need for a method and a system for handling samples, which allows for continuous and simultaneous monitoring of a plurality of samples in a simple and cost-effective manner.

SUMMARY

According to the present disclosure, a sample handling system for handling a plurality of samples is presented. The sample handling system can comprise a plurality of sample holders. Each sample holder can be configured to receive a sample container. The sample handling system can also comprise at least one sample transport device configured for moving the plurality of sample holders in at least one direction and at least one monitoring system configured for monitoring the plurality of samples during movement via the sample transport device. The monitoring system can comprise at least one camera module configured for continuously capturing images of at least a part of the sample transport device. The camera module can be arranged at a distance away from the sample transport device such that the camera module has a free field of view to the sample transport device. The monitoring system can also comprise at least one processor. The processor can be configured to process the captured images and determine at least one item of information about the sample transport device and/or the sample container and/or the sample from the captured images. The sample handling system can also comprise at least one control unit configured for controlling a functionality of the sample handling system. The control unit can be configured to retrieve the item of information from the processor. The controlling can be based on the retrieved item of information.

Accordingly, it is a feature of the embodiments of the present disclosure to provide a method and a system for handling samples, which allows for continuous and simultaneous monitoring of a plurality of samples in a simple and cost-effective manner. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
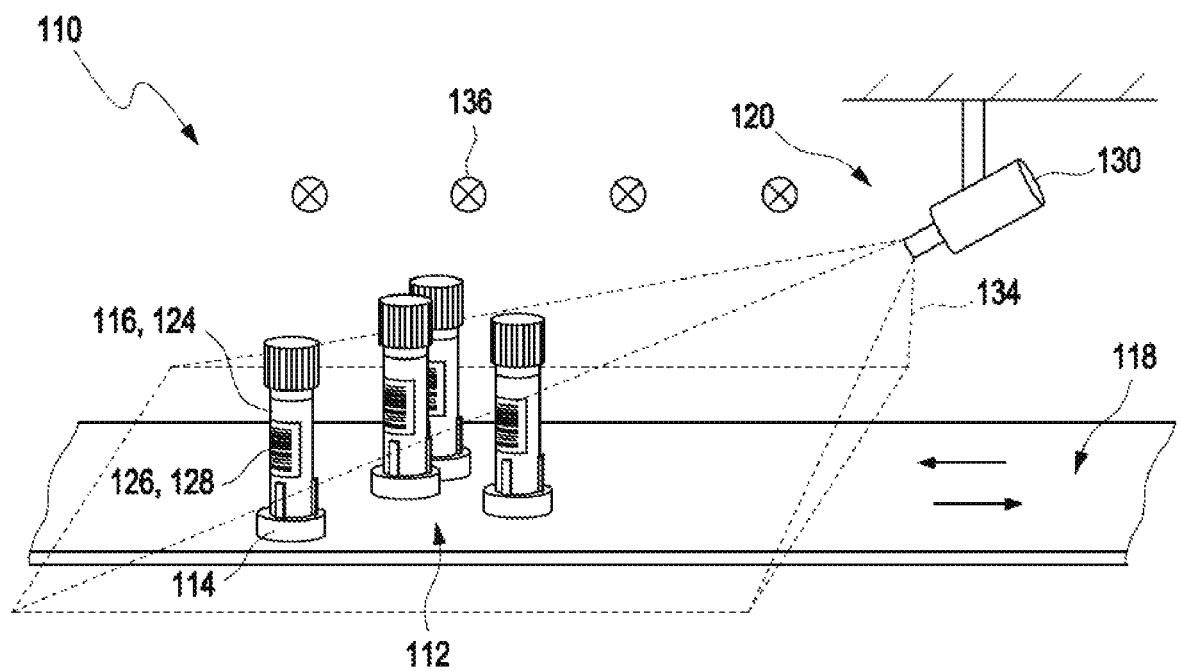
FIG. 1 illustrates a sample handling system according to a first embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

As used in the following, the terms "have", "comprise" or "include" or any arbitrary grammatical variations thereof can be used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it can be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms can be used in conjunction with optional features, without restricting alternative possibilities. Thus, features introduced by these terms can be optional features and may not be intended to restrict the scope of the claims in any way. The invention may, as the skilled person will recognize, be performed by using alternative features. Similarly, features introduced by "in an embodiment of the present disclosure" or similar expressions are intended to be optional features, without any restriction regarding alternative embodiments of the present disclosure, without any restrictions regarding the scope of the present disclosure and without any restriction regarding the possibility of combining the features introduced in such way with other optional or non-optional features of the present disclosure.

A sample handling system for handling a plurality of samples is disclosed.

The term "sample" as used herein can be a broad term and can be given its ordinary and customary meaning to a person of ordinary skill in the art and may not be limited to a special or customized meaning. The term specifically may refer, without limitation, to an aliquot of a substance such as a chemical or biological compound. Specifically, the sample may be or may comprise at least one biological specimen, such as one or more of: blood; blood serum; blood plasma; urine; saliva. Additionally, or alternatively, the sample may be or may comprise a chemical substance or compound and/or a reagent. The sample may specifically be a liquid sample, such as an aliquot of a fluid substance of the chemical or biological compound. For example, the liquid sample may be or may comprise at least one pure liquid, such as a liquid substance and/or a solution containing one or more liquid substances, comprising the at least one chemical and/or the biological substance. As another example, the liquid sample may be or may comprise a liquid mixture, such as a suspension, an emulsion and/or a dispersion of one or more chemical and/or biological substances. However, other, in particular non-liquid samples can be possible. For example, the container may be a reagent container. Other sample types may be, for example, tissue, homogenized material, calibration or monitoring tube-like devices may be the handling subject.

The term "handling" a sample, as used herein, can be a broad term and can be given its ordinary and customary meaning to a person of ordinary skill in the art and may not be limited to a special or customized meaning. The term specifically may refer, without limitation, to one or more of processing, moving, transferring, separating and analyzing samples, specifically liquid samples, temperizing, homogenizing (e.g., vortex), demolishing such as destroying, decontaminating or clearing through physical and/or chemical reactions e.g., bleaching, heating or evaporation, UV cameras, IR cameras and the like, identification such as labelling of the sample such that a sample is associated with a certain data set e.g., person name. The term "handling" a plurality of samples, as used herein, can be a broad term and may be given its ordinary and customary meaning to a person of ordinary skill in the art and may not be limited to a special or customized meaning. The term specifically may refer, without limitation, to simultaneous and/or parallel handling of more than one sample such as of two, three, four, more than ten, more than 100 samples. The sample handling system may be configured for parallel handling a large number of samples, such as up to 15,000 samples per hour, or the number of samples, which can be handled in parallel, may be only limited by computing power.

The term "sample handling system" as used herein can be a broad term and can be given its ordinary and customary meaning to a person of ordinary skill in the art and may not be limited to a special or customized meaning. The term specifically may refer, without limitation, to an arbitrary system comprising at least one component configured for performing at least one function of handling samples, specifically of handling liquid samples. In particular, the sample handling system can comprise a plurality of components which may be configured for interacting together to perform the at least one function of handling samples. Further, each of the components of the sample handling system may be configured for performing the at least one function of handling samples and thus, the sample handling system may be configured for performing a plurality of different functions of handling liquid samples. The sample handling system may specifically be configured for automatically handling samples, specifically, for handling samples individually, such as one sample after another and/or a plurality of samples simultaneously. The sample handling system may be configured for handling a plurality of samples, specifically, for handling a plurality of liquid samples contained by a plurality of sample containers. The sample handling system may be part of an automated laboratory, in particular, of an automated workflow series.

The sample handling system can comprise a plurality of sample holders. Each sample holder can be configured to receive at least one sample container. The sample handling system can also comprise at least one sample transport device configured for moving the plurality of sample holders in at least one direction and at least one monitoring system configured for monitoring the plurality of samples during movement via the sample transport device. The monitoring system can comprise at least one camera module configured for continuously capturing images of at least a part of the sample transport device. The camera module can be arranged at a distance away from the sample transport device such that the camera module has a free field of view to the sample transport device. The monitoring system can also comprise at least one processor. The processor can be configured for processing the captured images and, thereby, determining at least one item of information about the sample transport device and/or the sample container and/or the sample from the captured images, specifically, by image processing. The sample handling system can also comprise at least one control unit configured for controlling a functionality of the sample handling system. The control unit can be configured for retrieving the item of information from the processor. The controlling can be based on the retrieved item of information.

The term "sample container" as used herein can be a broad term and can be given its ordinary and customary meaning to a person of ordinary skill in the art and may not be limited to a special or customized meaning. The term specifically may refer, without limitation, to a receptacle, which can be configured for one or more of containing, storing and/or transporting a sample, specifically, a liquid sample. Further, the sample container may be configured for being handled in the sample handling system. Specifically, the sample container may be used in the field of medical and/or chemical laboratories. For example, the sample container may be selected from the group comprising of: a vessel; a vial; a syringe; a cartridge; an ampoule; or a tube. For example, the sample container may comprise a sample container body for containing the sample and a sample container closure, such as a cap for sealing the sample container. In the following, without restricting further possibilities, the option of a sample tube will be described, wherein the sample tube, as an example, may be positioned in the sample holder, with an open end pointing upwards.

The sample container may comprise at least one identifier. The identifier may identify the sample comprised by the sample container. The at least one identifier may comprise at least one of: an optical identifier such as a barcode and/or 2D-barcode such as a QR-code or an electronic identifier such as an RFID or NFC tag. The barcode may represent data in a visual, machine-readable form. The barcode may be a chemical barcode. The sample handling system may comprise in addition to the monitoring system at least one sensing unit based on other technologies, especially for the monitoring systems with low to moderate number of camera modules. For example, the sample handling system may comprise at least one reading device such as at least one RFID or NFC reader. The reading device may comprise at least one of: an optical reading device, such as a barcode reader and/or an imaging device for reading the barcode and/or the 2D-barcode; or a radio-frequency reading device, such as a RFID or NFC reader. The reading device may be part of the camera module or may be a separate device. For example, the monitoring system may be combined with at least one RFID station. RFID labelling of the single holders and the monitoring system with moderate number of fest-mounted camera modules may allow tracking through RFID and regular pairing between the sample and holder.

The term "sample holder" as used herein can be a broad term and can be given its ordinary and customary meaning to a person of ordinary skill in the art and may not be limited to a special or customized meaning. The term specifically may refer, without limitation, to an arbitrary device configured for receiving the at least one sample container. The receiving of the sample container may comprise at least partially enclosing and holding the sample container. Specifically, the sample holder may be shaped such that the sample holder may allow for receiving at least one sample container. For example, if the sample container comprises a sample tube, e.g., a sample container having a cylindrical elongated shape, the sample holder may comprise a circular intake configured for at least partially enclosing and holding the sample tube. Specifically, the sample holder may comprise a puck. The sample holder may be a single sample holder. The term "single" sample holder as used herein can be a broad term and can be given its ordinary and customary meaning to a person of ordinary skill in the art and may not be limited to a special or customized meaning. The term specifically may refer, without limitation, to the fact that each sample holder can carry only one sample container. The single sample holder may be configured for receiving one single sample container. The sample holder may be configured for receiving a plurality of sample containers. For example, the sample holder may be configured for transporting five sample containers, as disclosed in EP 3 070 479, the content of which is herewith included by reference. For example, the sample holder may be or may comprise at least one rack for transporting a plurality of sample containers. For example, the sample holder may be a single holder having a multi-adapter configured for transporting a plurality of sample containers. For example, the sample holder may be a single sample holder and the sample container may be a sample tube comprising a plurality of sub-container for transporting a plurality of samples. The sample holder may be configured to be moved by the at least one sample transport device, as will be outlined in further detail below.

The term "sample transport device" as used herein can be a broad term and can be given its ordinary and customary meaning to a person of ordinary skill in the art and may not be limited to a special or customized meaning. The term specifically may refer, without limitation, to an arbitrary device, which can be configured for moving and/or transporting and/or transferring and/or carrying objects from one position to another. Specifically, the transport device may be configured for moving the plurality of sample holders through the sample handling system such as from a loading station to another station of the sample transport device. The other station may be an analysis station. As an example, the transport device may comprise at least one transport element selected from the group comprising of: a conveyor, such as a belt conveyor or a chain conveyor, or a vehicle system, such as an electronic vehicle system. The sample transport device may be or may comprise a multilane transport system having a plurality of transport elements. The sample transport device may be or may comprise a plurality of parallel transport elements. The transport devices may be arranged in a common plane and/or in different planes such as on top of each other.

The term "moving" the plurality of sample holders, as used herein, can be a broad term and can be given its ordinary and customary meaning to a person of ordinary skill in the art and may not be limited to a special or customized meaning. The term specifically may refer, without limitation, to an action of transporting and/or transferring and/or carrying the sample holders by using the sample transport device. Specifically, the sample transport device may be configured for moving the sample holders individually. For example, each of the sample holders may be moved in at least one individual direction, specifically, independently from each other. For example, the movement of the sample holder may be a one-dimensional movement in one direction along the sample transport device. As another example, the movement of the sample holder may be a two-dimensional movement in two directions along the sample transport device. Additionally, or alternatively, the sample holder may be moved in a third direction by the sample transport device by passing a difference in height of the sample handling system. Further, the sample transport device may be configured for moving the plurality of sample holders in a bidirectional manner.

The term "monitoring system" as used herein can be a broad term and can be given its ordinary and customary meaning to a person of ordinary skill in the art and may not be limited to a special or customized meaning. The term, specifically, may refer, without limitation, to a device configured for determining at least one property of the sample transport device and/or the sample container and/or the sample. The action of monitoring may be or may comprise at least one of: detecting a presence and/or a status of an object; recognizing the presence and/or the status of an object; and/or tracking the presence and/or the status of an object. Specifically, the object to be monitored by the monitoring system may be any arbitrary object moved by the sample transport device. For example, the object may be one or more of the sample holder, the sample container, and/or any parts thereof, such as the body and/or the cap of the sample container and/or the sample contained by the sample container. The object may be element and/or parts of the transport system as well. Flow monitoring, for example, monitoring density over time and space, may not use an object detection based technique, but may be a function of the monitoring system. There are, in normal sample traffic, multiple samples, each at a sample holder, in the viewing field of the camera module. The monitoring system may be configured for monitoring a plurality of objects simultaneously.

The monitoring system can comprise at least one camera module. The term "camera module" as used herein can be a broad term and can be given its ordinary and customary meaning to a person of ordinary skill in the art and may not be limited to a special or customized meaning. The term specifically may refer, without limitation, to a device having at least one imaging device configured for capturing images of the part of the sample transport device. The term "image" as used herein can be a broad term and can be given its ordinary and customary meaning to a person of ordinary skill in the art and may not be limited to a special or customized meaning. The term specifically may refer, without limitation, to data recorded by using the camera module, such as a plurality of electronic readings from the imaging device, such as the pixels of the camera chip. The image may be a one-dimensional, two-dimensional (2D) or three-dimensional (3D) image. The image may comprise even more dimensions such as different color or spectral, distance, multisensory such as from a camera and a LIDAR system, so that the image may comprise more than a three-dimensional signal per pixel. As an example, the camera module may comprise at least one camera chip, such as at least one CCD chip and/or at least one CMOS chip configured for recording images. The camera module, besides the at least one camera chip or imaging chip, may comprise further elements, such as one or more optical elements, e.g., one or more lenses. As an example, the camera module may be a fix-focus camera, having at least one lens, which can be fixedly adjusted with respect to the camera module.

Alternatively, however, the camera module may also comprise one or more variable lenses, which may be adjusted, automatically or manually. The camera module may comprise a CMOS chip in combination with e.g., one or more of a Bayer pattern, a different filter system, or a non-visible light detecting. The camera module may comprise a distance detection, multi-focus by combining multiple cameras such as standard smartphones, and/or other sensors such as ultrasound sensor and the like. The camera may comprise at least one UV camera or at least one IR camera.

The camera module may comprise at least one camera, specifically, a monochrome or polychrome camera, also referred to as a color camera. Thus, for each pixel, color information may be provided or generated, such as color values for three colors R, G, B. A larger number of color values may also be feasible, such as four-color values for each pixel, for example R, G, G, B. Color cameras are generally known to the skilled person. Thus, as an example, the camera chip may comprise of a plurality of three or more different color sensors each, such as color recording pixels like one pixel for red (R), one pixel for green (G) and one pixel for blue (B). For each of the pixels, such as for R, G, B, values may be recorded by the pixels, such as digital values in the range of 0 to 255, depending on the intensity of the respective color. Instead of using color triples such as R, G, B, as an example, quadruples may be used, such as R, G, G, B. The color sensitivities of the pixels may be generated by color filters or by appropriate intrinsic sensitivities of the sensor elements used in the camera pixels. These techniques are generally known to the skilled person. However, as outlined above, the camera module may not be limited to visible light.

The term "capturing images" as used herein can be a broad term and can be given its ordinary and customary meaning to a person of ordinary skill in the art and may not be limited to a special or customized meaning. The term specifically may refer, without limitation, to a process imaging and/or image recording and/or image acquisition. The capturing of images may comprise capturing a plurality of images such as a sequence of images. In particular, the capturing of images may comprise recording continuously a sequence of images such as a video or a movie. The images may be captured in a frequency depending on a sample moving speed. As an example, the camera module may capture images in a frequency above 1 Hz.

The capturing of the at least one image may automatically be initiated, e.g., once the presence of at least one sample holder within a field of view and/or within a predetermined sector of the field of view of the camera is automatically detected. These automatic image acquisition techniques are generally known e.g., in the field of automatic barcode readers, such as from automatic barcode reading apps. The capturing of the images may take place, as an example, by acquiring a stream or "life stream" of images with the camera module, wherein one or more of the images, automatically can be stored and used for further processing. The image acquisition may be supported by the processor of the monitoring system, and the storing of the images may take place in a data storage device of the monitoring system.

The term "part of the sample transport device" as used herein can be a broad term and can be given its ordinary and customary meaning to a person of ordinary skill in the art and may not be limited to a special or customized meaning. The term specifically may refer, without limitation, to a region of the sample transport device being on the field of view of the camera module. The camera module may have at least one field of view covering at least the part of the at least one sample transport device. The distance and optics field of the camera can differ based on the use cases as well as the camera hardware. The at least one field of view of the camera module may be adjustable.

The camera can be arranged at a distance away from the sample transport device such that the camera module can have a free field of view to the sample transport device. Specifically, the at least one camera module may be arranged above the at least one sample transport device. The term "arranged above" as used herein can be a broad term and can be given its ordinary and customary meaning to a person of ordinary skill in the art and may not be limited to a special or customized meaning. The term "arranged above" specifically may refer, without limitation, to an arrangement of the camera module relative to a plane or planes of the transport element of the sample transport device with respect to a direction of gravity. The camera module may be arranged such that it can image the part of the sample transport device from downwards. The camera module may be configured for imaging an overview of the part of the sample transport device. The camera module may have the part of the sample transport device in the field of view, specifically the plurality of sample holder moved on the sample transport device. For example, the at least one camera module may specifically be arranged opposite to the at least one sample transport device. For transport system having multiple levels, the monitoring system can be placed above each level or layer. For a vertical transport system, the monitoring system can be placed beside the transport system.

The camera module may be a fixed camera module. Additionally, or alternatively, the camera module may be or may comprise at least one movable camera. For example, the camera module may be attached to at least one guiding rail. The guiding rail may be arranged opposite to the at least one sample transport device. The camera module may be movable along the guiding rail.

The camera module may comprise a multi-camera monitoring system. The camera module may comprise a plurality of cameras. The camera module may comprise a high density or moderate density of permanently mounted cameras each viewing a certain transport area continuously.

For example, the monitoring system may comprise a high density of permanently mounted camera modules each viewing a certain transport area continuously. All transport surfaces may be covered by at least one camera module's viewing field, such that there is no gap on the sample transport device that is not imaged. This may allow a total transport monitoring by stitching all images captured by the plurality of cameras in a cloud together. The stitching may be performed by using images acquired at the same time or within a time duration shorter than that between two frames taken by the same camera. The stitching may comprise using a registration based on a defined pattern. The registration may comprise one or more of a reference map such as a layout of the sample transport device, a calibration element, specifically for correcting perspective distortion, a registration including 2.5 dimension, specifically, a height up to about 30 cm above the transport system may also be of interest, special and potentially time warping based on key reference points, visualization, processing and/or integration of redundant information. The registration may use a random sample consensus (RANSAC) algorithm. By stitching short-distance tracking paths using registration, a long-distance or total-path tracking of the sample can be performed. The stitching can be done before the tracking. The monitoring system can be configured for monitoring the entire sample transport device in a huge image-map over time, such as a video. Thus, the trajectory of each sample can be tracked directly end-to-end in the total video, instead of stitching short-distance tracks detected by every camera.

For example, the monitoring system may comprise a moderate density of permanently mounted camera modules. In this case, the viewing fields of the cameras cannot be stitched gapless. By combining short-distance tracks of a sample with the same ID, paths that are not monitored can be interpolated. By comparing the features and status of the sample in different fields, irregularity and errors that are not cached by the camera module directly, can still be detected. In case that the sample ID cannot be detected well, an assignment of the samples when it first appears in a camera module's field can be performed by combining the images of the last camera module, and, specifically, the features of the sample derived therefrom, and Laboratory Information System (LIS) or further connected routing software modules route planning information such as direction, speed, and/or predicted position. The LIS or further software modules connected to the LIS may know the sample ID, the planned track and destination, or even the tracking (e.g., transport managing system) of the transport system itself.

The monitoring system may comprise camera modules that constantly changing their perspectives by moving and turning and/or zooming. This may allow the installation of a moderate or low number of camera modules but still allow monitoring. This may reduce the frequency that a certain area is imaged but can cover again the monitoring of the entire sample transport device without gaps. In this case, short-distance tracking might not be possible. By stitching the images over time and distance, long-distance tracking may be possible by combining the camera images, space and time information, sample ID and route planning information of each sample.

The monitoring system can comprise at least one processor. The term "processor", also denoted as processing device, as used herein can be a broad term and can be given its ordinary and customary meaning to a person of ordinary skill in the art and may not be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math co-processor or a numeric coprocessor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit (CPU). Specifically, the processor may be or may comprise at least one Graphics Processing Unit (GPU). Additionally, or alternatively, the processor may be or may comprise a microprocessor, thus specifically the processor's elements may be contained in one single integrated circuitry (IC) chip. Additionally, or alternatively, the processor may be or may comprise one or more application-specific integrated circuits (ASICs) and/or one or more field-programmable gate arrays (FPGAs) or the like. The processor may be part of the camera module or may be a processor connected to the camera module.

The processor can be configured for processing the images captured by the camera module. Thereby, the processor can be configured for determining at least one item of information about the sample transport device and/or the sample container and/or the sample from the captured images. The term "item of information" as used herein can be a broad term and can be given its ordinary and customary meaning to a person of ordinary skill in the art and may not be limited to a special or customized meaning. The term specifically may refer, without limitation, to one or more of an electronic information, a variable or a parameter characterizing a status of the sample handling system and/or any parts thereof. For example, the item of information may be an electronic information about the sample transport device and/or the sample container and/or the sample. The at least one item of information may comprise at least one item of information selected from the group comprising of: an item of loading information providing information on a loading status of the at least one sample holder; an item of status information providing information on a status of the sample container, such as a capping status of the sample container, a shape status of the sample container and/or a sample issue status of the sample container; an item of tracking information providing information on a track of motion of the sample container; an item of motion information providing information on a speed and/or an acceleration of the motion of the sample container; an item of density information providing information on the density of sample holders moved by the at least one transport device; and/or an item of event information providing information about an event, such as an accident of sample holders and/or a spilling of a sample. Specifically, the item of information may comprise information about a filling level of the sample. Specifically, the at least one item of information may comprise any kind of damage of the sample container and/or transport system and/or sample holder and/or sample labels. The status of the moving information may comprise information about moving difficulties or unsmooth movement such as vibration due to obstacles below the sample holder. The status of the moving information may further comprise information about a relative position or relative position changes between the sample container and the container holder such as vibrations. The status of the sample container may comprise loss of cap or parts of the sample, inclination of the sample, inclination of the cap, unexpected height such as a positioning error, of the sample container. For example, the status information about the sample container may comprise the type of the sample container by recognizing the container itself as well as manufacture labelled information, in particular, considering that the sample container may not be only a tube or blood sample but other type of transportable objects as well.

The item of information determined by the processor may be event information, in particular, about a failure of the sample transport device. The sample handling system, in particular, the processor, may be configured for identifying the exact positions of the samples on defective modules of the sample transport device from the captured images. The impact to the surrounding and action after reboot can be estimated and optimized.

The item of information from the processor may comprise an item of event information providing information about an event, specifically, a detection of an accident event. Accident event detection may comprise recognizing non-single holders, such as spilled material, lost caps, sticking together due to label issues and the like, on the sample transport device. The recognizing may comprise using methods in the machine-learning field and/or deep learning field such as inspection, in particular, detection of unexpected structures on a surface. High inclination of the sample tube, such as feature extraction on the sample tube crops, may increase spillage or crashing risks. The processor may be configured for requesting and/or proving an alarm to the control unit upon detection before crashing.

The item of information determined by the processor may be an item of status information providing information on a status of the sample container, such as obstacles that are not loaded on the sample holder, e.g., accidentally lost caps due to, for example, unexpected higher pressure in the tube.

The item of information determined by the processor may comprise information about unsafe load containers. Such containers can be identified before they crash with other objects, can be isolated and/or sorted out of the workflow. This may allow preventing spillages and/or loss of sample, blockages.

The item of information determined by the processor may comprise information about the sample issue status, such as pulling off of a label, loss of the cap or foil, and the like. The processor can detect the sample issue status by comparing the sample capping status with the middleware's register as well as measuring the sample tube shape and comparing it with the normal status' parameters.

The item of information determined by the processor may comprise information about "traffic jam". A root cause may be identified either, automatically by video processing, or remote assignment by an operator.

The item of information determined by the processor may comprise information about a loading status of the sample holders. The monitoring system, in particular, the processor, may be configured for pairing detected sample holders with the samples. The monitoring system, in particular, the processor, may be configured for identifying which sample holders in the viewing points are loaded with a sample.

The item of information determined by the processor may comprise information about a capping status. The detection of capping can be performed for the detected samples using, for example, classification methods using at least one machine learning approach such as, for example, using a Support Vector Machine (SVM) or a convolutional neural network (CNN) on cropped tube image sections. Other machine learning approaches may be possible too, such as random forest, nearest neighbor and the like.

The item of information determined by the processor may comprise information about movement in 6-dimensions. Specifically, the item of information determined by the processor may comprise information about speed and/or acceleration and/or vibration of the sample transport device. The processor may be configured for post-processing tracking data identifying timely movement issues due to e.g., holder defect, such as irregularity of single samples, or defects of the sample transport device, such as multiple samples in the sample holder.

The term "processing" of the captured images as used herein can be a broad term and can be given its ordinary and customary meaning to a person of ordinary skill in the art and may not be limited to a special or customized meaning. The term specifically may refer, without limitation, to a processing of image data by using one or more computer vision algorithm. Specifically, the image processing may be or may comprise at least one computer vision algorithm for determining the at least one item of information about the sample transport device and/or the sample container and/or the sample from the captured image. For example, the computer vision algorithm may be or may comprise at least one object detection algorithm, such as one or more of pattern matching, machine learning methods or deep learning methods in the object detection field such as at least one You Only Look Once (YOLO) real-time object detection algorithm.

The processor may be configured for sample detection in real time. The detection of the sample may be performed using image processing, such as pattern matching, machine learning methods, or deep learning methods, in the object detection field. For example, the YOLO algorithm may be used with two ankle boxes, one for the sample and one for the sample holder. This may allow detection of all samples, preliminary, in tube format, and empty sample holders in the viewing field and marked with a bounding box.

The processor may be configured for short distance tracking. For example, the processor may be configured for processing image sequences taken by the same camera module for each of the sample while the sample is in the viewing field of the camera module, such as from entering to exit. The processor may be configured for using at least one tracking method. The tracking method may depend on the imaging frequency, sample density and moving speed. The tracking method may comprise one or more of nearest neighbor mapping, Kalmann filter, or even movement model based tracking. The tracking may be implemented independently using only the imaging data and/or implemented in combination with prior knowledge provided by the transport system such as the movement control algorithm, planned routes and/or expected position or speed for every sample holder. The information from the transport system may be integrated in the tracking algorithms of the processor and/or gathered from the transport system in real time through communication paths e.g., through the lab information system (LIS) or connected software modules, or cloud.

The sample handling system may further comprise at least one illumination device. The term "illumination device" as used herein can be a broad term and can be given its ordinary and customary meaning to a person of ordinary skill in the art and may not be limited to a special or customized meaning. The term specifically may refer, without limitation, to, an arbitrary device comprising at least one light source configured for generating at least one light beam for illuminating at least one object. The illumination device may be configured for illuminating at least part of the at least one sample transport device, specifically, at least one region of the sample transport device corresponding to the field of view of the camera module.

The sample handling system can comprise at least one control unit configured for controlling a functionality of the sample handling system. The camera module may be connected, directly or indirectly, with the control unit. The control unit may be or may comprise at least one centralized control unit and/or may be or may comprise at least one cloud infrastructure. The cloud infrastructure may comprise at least one cloud server. The term "centralized control unit", also denoted centralized transport control (TMS), as used herein can be a broad term and can be given its ordinary and customary meaning to a person of ordinary skill in the art and may not be limited to a special or customized meaning. The term specifically may refer, without limitation, to an electronic device configured, specifically, by hardware and/or by software programming, for controlling the functionality of the sample processing system. The centralized control unit may further be configured for data exchange with the at least one monitoring system and/or at least one cloud server. Specifically, the control unit may be or may comprise a computing device, such as at least one processor, configured for receiving an electronic signal, such as the at least one item of information, from the at least one monitoring system and/or the at least one cloud server, and for further evaluating the received signal. Further, the control unit may be configured for controlling the functionality based on the received and evaluated signal, for example, based on the at least one item of information.

The term "controlling the functionality" as used herein can be a broad term and can be given its ordinary and customary meaning to a person of ordinary skill in the art and may not be limited to a special or customized meaning. The term specifically may refer, without limitation, to one or more of determining, assessing, verifying, maintaining or setting the at least one functionality of the sample handling system. For example, controlling the functionality of the sample handling system may comprise controlling the transport element of the sample transport device such as transport speed, direction and the like. The functionality may be controlled by the control unit based on the at least one item of information about the sample transport device and/or the sample container and/or the sample.

The control unit may be configured for retrieving the item of information from the processor directly or indirectly. The processor of the monitoring system may be configured for unidirectional or bidirectional exchange of the item of information with the control unit, in particular, with the centralized control unit. The sample handling system may further comprise a lab information system (LIS), wherein the lab information system may be configured for exchanging data with the centralized control unit. The data exchange may be from the lab information system to the centralized control unit or vice versa. The processor of the camera module may be configured for exchanging data with the LIS. The data exchange may be from the processor to the LIS or vice versa. The sample handling system further may comprise at least one cloud server such as the cloud server of the control unit or a further cloud server. The cloud server may be a laboratory internal cloud server and/or an external cloud server. The lab information system may be configured for exchanging data with the cloud server. The data exchange may be from the lab information system to the cloud server or vice versa. The camera module may be connected to the cloud server for transferring image data, detection output, as well as gathering information from other components in the sample handling system. Through the cloud server, the calculation and storage intensive procedures can be performed. The monitoring system, specifically, the at least one processor comprised by the monitoring system, may be configured for unidirectional or bidirectional exchange of the item of information with the cloud server. However, other data exchange and communication between the devices may be possible. For example, communication between processor and cloud may be performed without the centralized control unit or LIS. Specifically, all processors may directly communicate with the cloud server.

The monitoring system may be connected with the control unit and may ask for turning action for the loaded sample holders. In this case, the sample may turn into a position at which the barcode or ID can be faced towards the camera. Using standard barcode reading functions, the camera module can read the ID of the sample.

Known systems for monitoring sample containers can rely on data that can be generated by the successful contact between a sample holder and a transport system. It may not deliver real time signal once the contact between the puck and the transport system gets lost. When an unknown object—other than the puck, such as cap, lands on the transport system, there may be no information delivered by the system. Further, the general principle of known systems can be tracking of the pucks but not the sample directly. By installing optical monitoring according to the present disclosure, it may be possible to have direct information about the status of the sample containers, and not just the sample holders that carry them, in real time and real position. The present disclosure may provide real-time visualization of the entire pipeline allowing efficient remote monitoring by the operator, especially in the case of multiple failures in a huge laboratory, such that the operator can prioritize his actions. The present sample handling system may provide real-time record of the samples over time supporting laboratory documentation and/or remote customer support. The sample handling system may provide a large amount of data that can serve as a resource for data analytics, and/or as an infrastructure that can be used for our future data analytics products, e.g., predictive or detective maintenance, as well as for training purpose for both service as well as laboratory personnel.

The sample handling system may comprise at least one alert system configured for issuing at least one alert in case of an identified failure. The present disclosure may allow the sample handling system to alert the operator in the case of spillage so that it can be dealt with before the spillage is spread or before it adversely affects the performance of the system. The alert system may be part of the processor and/or of the centralized control unit or located in the cloud server. The alert system may be configured for alarming when the density of the sample tubes exceeds a certain threshold, e.g., if a number of samples per viewing area exceeds a certain threshold. For example, the monitoring system may be configured for remote problem identification and resolution for a customer through e.g., tablets that can connect and visualize the data stored in the cloud server. In the case of using a monitoring system with multiple moving or turning camera modules, the customer can, by alarm, direct the camera to the field of issue and can perform remote situation analysis. For example, the monitoring system may be configured for detection when new hardware modules such as analyzers, decappers, buffers, further transport modules, and the like, which can be attached to the sample transport device. The monitoring system may be configured for alerting the laboratory internal system to an identity of the new module, allowing for fully automatic configuration of the laboratory software to include the new module in the laboratory's workflow.

Once the cameras are installed, the optional features can be implemented step by step over releases.

A method for handling a plurality of samples is disclosed. In the method, at least one sample handling system according to the present disclosure can be used. Thus, for definitions and embodiments of the method reference is made to definitions and embodiments of the sample handling system.

The method can comprise the following steps, which, as an example, may be performed in the given order. It can be noted, however, that a different order can also be possible. Further, it can also be possible to perform one or more of the method steps once or repeatedly. Further, it can be possible to perform two or more of the method steps simultaneously or in a timely overlapping fashion. The method may comprise further method steps, which are not listed.

The method can comprises a) receiving at least one sample container in at least one sample holder; b) moving the at least one sample container in the sample holder by using at least one sample transport device; and c) monitoring the plurality of samples during movement via the sample transport device by using at least one monitoring system. The monitoring can comprise capturing images of at least a part of the sample transport device by using at least one camera module of the monitoring system and processing the captured images by using at least one processor of the monitoring system, thereby determining at least one item of information about the sample transport device and/or the sample container and/or the sample from the captured images. The method can also comprise d) retrieving the item of information from the processor by at least one control unit and controlling a functionality of the sample handling system based on the retrieved item of information.

Further disclosed and proposed herein is a computer program including computer-executable instructions for performing the method according to the present disclosure in one or more of the embodiments enclosed herein when the program can be executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps a) to d) may be performed by using a computer or a computer network, preferably by using a computer program.

Further disclosed and proposed herein is a computer program product having program code, in order to perform the method according to the present disclosure in one or more of the embodiments enclosed herein when the program is executed on a computer or computer network. Specifically, the program code may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code stored on a machine-readable carrier, in order to perform the method according to one or more of the embodiments disclosed herein, when the program is executed on a computer or computer network. As used herein, a computer program product can refer to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal, which can contain instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:
a computer or computer network comprising at least one processor, wherein the processor can be configured to perform the method according to one of the embodiments described in this description,
a computer loadable data structure that can be configured to perform the method according to one of the embodiments described in this description while the data structure can be executed on a computer,
a computer program, wherein the computer program can be configured to perform the method according to one of the embodiments described in this description while the program can be executed on a computer,
a computer program comprising a program for performing the method according to one of the embodiments described in this description while the computer program can be executed on a computer or on a computer network, a computer program comprising a program according to the preceding embodiment, wherein the program can be stored on a storage medium readable to a computer, a storage medium, wherein a data structure can be stored on the storage medium and wherein the data structure can be configured to perform the method according to one of the embodiments described in this description after having been loaded into a main and/or working storage of a computer or of a computer network, and a computer program product having program code, wherein the program code can be stored or are stored on a storage medium, for performing the method according to one of the embodiments described in this description, if the program code can be executed on a computer or on a computer network.

Summarizing and without excluding further possible embodiments, the following embodiments may be envisaged:

A sample handling system for handling a plurality of samples is presented. The sample handling system can comprise a plurality of sample holders. Each sample hold can be configured to receive a sample container. The sample handling system can also comprise at least one sample transport device configured for moving the plurality of sample holders in at least one direction and at least one monitoring system configured for monitoring the plurality of samples during movement via the sample transport device. The monitoring system can comprise at least one camera module configured for continuously capturing images of at least a part of the sample transport device. The camera module can be arranged at a distance away from the sample transport device such that the camera module has a free field of view to the sample transport device. The monitoring system can also comprise at least one processor. The processor can be configured for processing the captured images and, thereby, determining at least one item of information about the sample transport device and/or the sample container and/or the sample from the captured images. The sample handling system can also comprise at least one control unit configured for controlling a functionality of the sample handling system. The control unit can be configured for retrieving the item of information from the processor. The controlling can be based on the retrieved item of information.

The at least one item of information can comprise at least one item of information selected from the group comprising of: an item of loading information providing information on a loading status of the at least one sample holder; an item of status information providing information on a status of the sample container, such as a capping status of the sample container, a shape status of the sample container and/or a sample issue status of the sample container; an item of tracking information providing information on a track of motion of the sample container; an item of motion information providing information on a speed and/or an acceleration of the motion of the sample container; an item of density information providing information on the density of sample holders moved by the sample transport device; and/or an item of event information providing information about an event, such as an accident of sample holders and/or a spilling of a sample.

The sample transport device can comprise a multilane sample transport system.

The camera module can have at least one field of view covering at least the part of the at least one sample transport device.

The at least one camera module can comprise at least one monochrome or polychrome camera.

The camera module can capture images in a frequency depending on a sample moving speed. The camera module can capture images in a frequency above 1 Hz.

The camera module can comprise a plurality of cameras. The camera module can comprise a high density or moderate density of permanently mounted cameras. Each camera can view a certain transport area continuously.

The camera module can comprise a plurality of cameras. The cameras can be configured for constantly changing their perspectives by moving and turning and/or zooming.

The processor can be configured for sample detection in real time.

The processing of the images can comprise using of at least one object detection algorithm. The processing of the images can comprise one or more of pattern matching, machine learning methods or deep learning methods in the object detection field such as at least one You Only Look Once (YOLO) real-time object detection algorithm.

The monitoring system can be configured for unidirectional or bidirectional exchange of the item of information with the control unit.

The sample handling system can further comprise at least one cloud server.

The monitoring system can be configured for unidirectional or bidirectional exchange of the item of information with the cloud server.

The sample container can comprise at least one identifier. The identifier can identify the sample comprised by the sample container.

The at least one identifier can comprise at least one of: an optical identifier such as a barcode and/or a 2D-barcode such as a QR-code or an electronic identifier such as an RFID or NFC tag.

The sample handling system can further comprise at least one reading device. The reading device can comprises at least one of: an optical reading device, such as a barcode reader and/or an imaging device for reading the barcode and/or the 2D-barcode such as a QR-code or a radio-frequency reading device, such as a RFID or NFC reader.

The sample handling system can further comprise at least one illumination device. The illumination device can be configured for illuminating at least part of the sample transport device.

A method for handling a plurality of samples is presented. In the method, at least one of the above sample handling system can be used. The method can comprise a) receiving at least one sample container in at least one sample holder, b) moving the at least one sample container in the sample holder by using at least one sample transport device, and c) monitoring the plurality of samples during movement via the sample transport device by using at least one monitoring system. The monitoring can comprise capturing images of at least a part of the sample transport device by using at least one camera module of the monitoring system and processing the captured images by using at least one processor of the monitoring system, thereby determining at least one item of information about the sample transport device and/or the sample container and/or the sample from the captured images. The method can also comprise d) retrieving the item of information from the processor by at least one control unit and controlling a functionality of the sample handling system based on the retrieved item of information.

A computer program comprising instructions, which when the program is executed by the above sample handling system, can cause the sample handling system to carry out at least steps a. to d. of the above method.

A computer-readable storage medium comprising instructions which when executed by the above sample handling system, can cause the sample handling system to carry out at least steps c. and d. of the above method.

Referring initially to FIG. 1, in FIG. 1, an exemplary first embodiment of a sample handling system 110 for handling a plurality of samples is shown in a perspective view. The sample handling system 110 can comprise a plurality of sample holders 112. Each sample holder 114 can be configured for receiving a sample container 116. Further, the sample handling system 110 can comprise at least one sample transport device 118 and at least one monitoring system 120. The sample handling system can comprise further at least one control unit 121, in particular, a centralized control unit 122, which is not visible in FIG. 1.

The sample container 116 received in the sample holder 114 may be configured for one or more of containing and/or storing and/or transporting the at least one sample handled in the sample handing system 110. Specifically, the sample may be a liquid sample and may comprise at least one chemical or biological compound, such as one or more of: blood; blood serum; blood plasma; urine; saliva. However, other, in particular non-liquid samples can be possible. For example, the container may be a reagent container. Other sample types may be, for example, tissue, homogenized material, calibration or monitoring tube-like devices may be the handling subject. As shown in FIG. 1, the sample container 116 may be a sample tube 124. Further, the sample container 116 may comprise at least one identifier 126, wherein the identifier 126 may identify the sample comprised by the sample container 116. As an example, the identifier 126 may be an optical identifier, such as a barcode 128 and/or a 2D-barcode such as a QR-code. As another example, the identifier 126 may also comprise an electronic identifier, such as a RFID or NFC tag.

The sample transport device 118 can be configured for moving the plurality of sample holders 112 in at least one direction, as indicated in FIG. 1 by the arrows pointing in the at least one direction of motion. The sample transport device 118 may comprise a multilane transport system having a plurality of transport elements. For example, the transport device 118 may comprise a plurality of parallel transport elements. Thus, the sample transport device 118 may be configured for moving each of the sample holders 114 individually, specifically, independently from each other. For example, the sample transport device 118 may be configured for moving the sample holders 114 in two directions such that the motion of the sample holder 114 may be two-dimensional motion.

The monitoring system 120 can comprise at least one camera module 130 and at least one processor 132, wherein the processor 132 comprised by the monitoring system 120 is not visible in FIG. 1. The camera module 130 can be configured for continuously capturing images of at least a part of the sample transport device 118. The camera module 130 may have the part of the sample transport device 118 in a field of view 134. In normal traffic, there may be multiple sample holders 114 and/or other objects, such as the sample container 116 and/or any parts thereof, present on the sample transport device 118. Thus, the monitoring system 120, specifically, the camera module 130, may be configured for simultaneously monitoring a plurality of objects on the sample transport device 118.

As an example, the camera module 130 may be a fixed mounted camera. The camera module 130 may be arranged above the sample transport device 118. As shown in FIG. 1, the camera module 130 may be arranged such that it can image the part of the sample transport device 118 from downwards. Thus, the camera module 130 may be configured for imaging an overview of the plurality of sample holders 112 moved by the sample transport device 118.

Further, the sample handling system 110 may comprise at least one illumination device 136. The illumination device 136 may be configured for illuminating the part of the sample transport device 118, specifically, the part of the sample transport device 118 corresponding the field of view 134 of the camera module 130.

Figure 2:
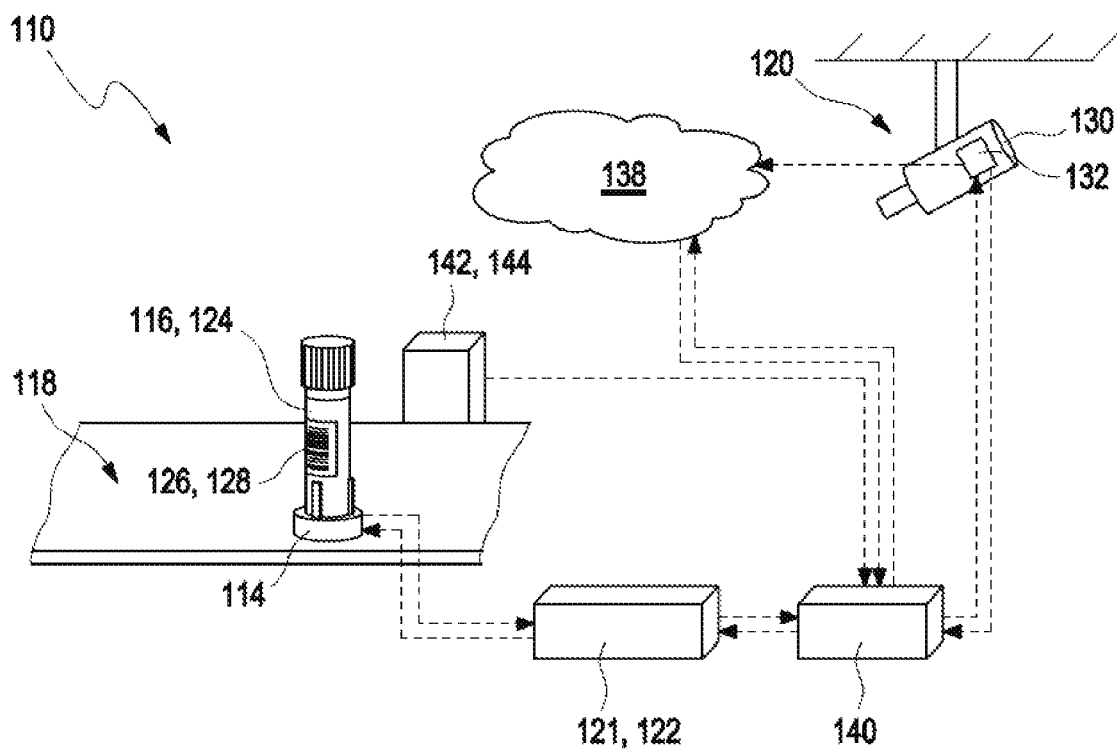
FIG. 2 illustrates a sample handling system according to a second embodiment of the present disclosure.

In FIG. 2, an exemplary second embodiment of the sample handling system 110 is shown in a perspective view. The sample handling system 110 of FIG. 1 may correspond widely to the sample handling system of FIG. 1. Therefore, reference may be made to the description of FIG. 1.

Figure 3:
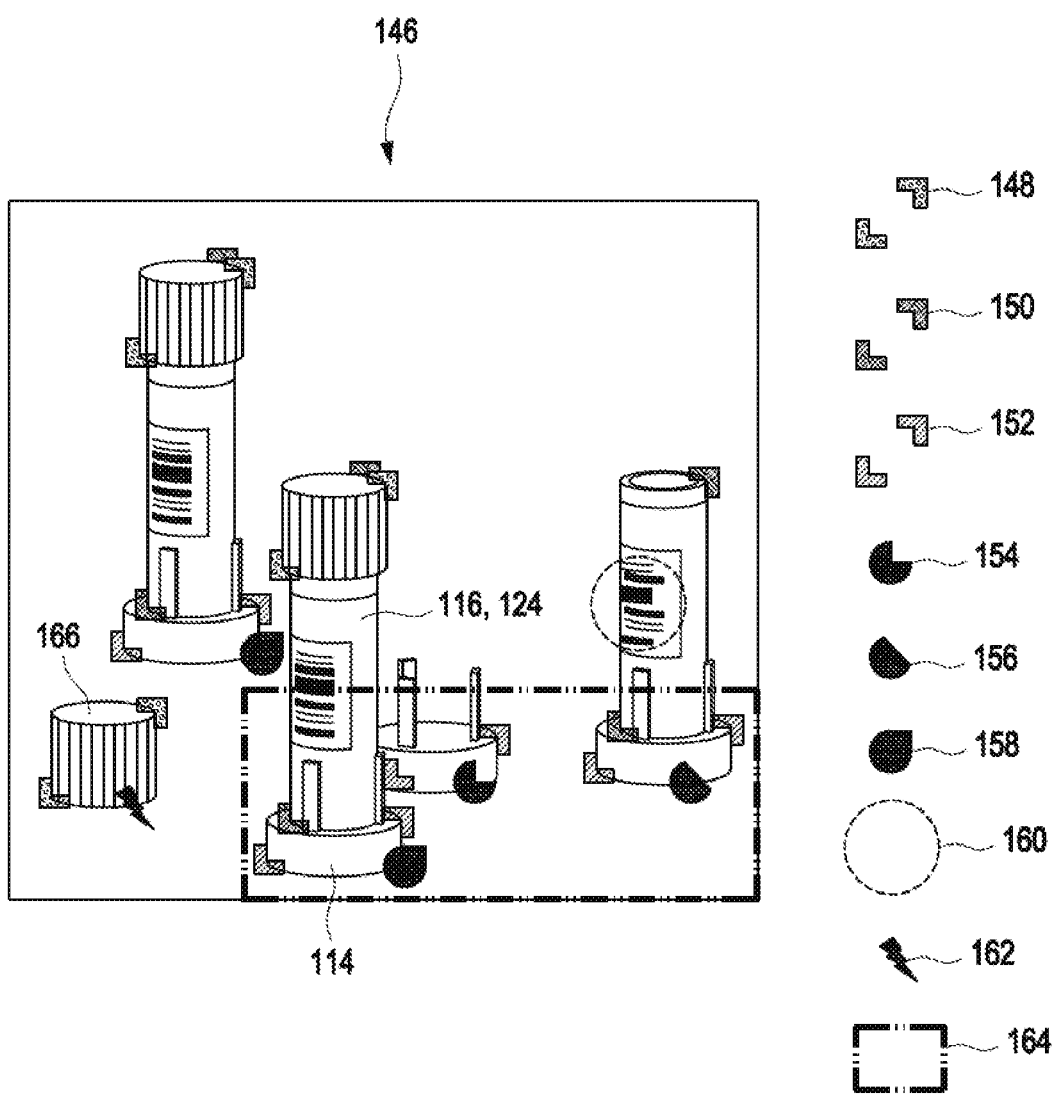
FIG. 3 illustrates an example image and a list of possible features detector by a processor according to an embodiment of the present disclosure.

As shown in FIG. 2, the monitoring system 120 can comprise the at least one processor 132. The processor 132 can be configured for processing the images captured by the camera module 130. Thereby, the processor 132 can be configured for determining at least one item of information about the sample transport device 118 and/or the sample container 116 and/or the sample from the captured image, specifically, by image processing. The processing of the captured images is shown in FIG. 3 and, thus, will be described in further detail below. Therefore, reference may be made to the description of FIG. 3.

Further, the sample handling system 110 may comprise at least one cloud server 138. The cloud server 138 may be configured for data exchange. Specifically, the processor 132 of the monitoring system 120 may be configured for unidirectional or bidirectional exchange of the item of information with the cloud server 138. The data exchange is shown by two arrows pointing from the cloud server 138 to the process 132 and vice versa.

The sample handling system 110 can further comprise the at least one centralized control unit 122. The centralized control unit 122 can be configured for controlling a functionality of the sample handling system 110. Further, the centralized control unit 122 can be configured for retrieving the item of information from the processor 132, wherein the controlling can be based on the retrieved item of information. Thus, the monitoring system 120, specifically, the process 132, may be configured for unidirectional or bidirectional exchange of the item of information with the centralized control unit 122. As another example, the centralized control unit 122 may be configured for data exchange with the cloud server 138.

The sample handling system 110 may further comprise a lab information system 140, wherein the lab information system may be configured for exchanging information with the centralized control unit 122. The data exchange is shown by two arrows pointing from the lab information system 140 to the centralized control unit 122 and vice versa.

Further, the sample handling system 110 may comprise at least one other sample-monitoring device 142. For example, the other sample-monitoring device 142 may be or may comprise at least one reading device 144. The reading device 144 may be configured for reading the at least one identifier 126 comprised by the sample container 116 and, thus, for identifying the sample contained by the sample container 116. As an example, the reading device 144 may be or may comprise an optical reading device, such as a barcode reader and/or an imaging device for reading the barcode and/or the 2D-barcode such as the QR-code. As another example, the reading device 116 may be or comprise an electronic reading device, such as a radio-frequency reading device, for example a RFID or NFC reader.

FIG. 3 shows an exemplary embodiment of an image 146 captured by the monitoring system 120 and the accompanying image processing. The image processing may specifically comprise at least one object detection algorithm. For example, the image processing may comprise one or more of pattern matching, machine learning methods or deep learning methods in the object detection field, such as at least one You Only Look Once (YOLO) real-time object detection algorithm. The image processing may specifically be done by the processor 132 of the monitoring system 120 such as in a "on the fly" manner. Thus, the monitoring system 120 may allow for real-time object detection. Specifically, the processor 132 may be configured for sample detection in real time.

As shown in FIG. 3, the object detection algorithm may be configured for detecting a plurality of different objects. Detected objects may be flagged on the captured image 146 and marked with a bounding box. A legend of the markers of the different bound boxes is also shown in FIG. 3. Therein, reference number 148 can denote a marker "sample tube cap detected"; reference number 150 can denote a marker "sample tube detected"; reference number 152 can denote a marker "sample holder detected"; reference number 154 can denote a marker "unloaded sample holder status"; reference number 156 can denote a marker "loaded with open sample"; reference number 158 can denote a marker "loaded with capped sample"; reference number 160 can denote a marker "label damage or mismatch"; reference number 162 can denote a marker "unexpected objects on the sample transport device"; and reference number 164 can denote a marker "dens traffic area".

As an example, the image processing of the captured image 146 may allow identifying samples and/or unexpected objects on the sample transport device 118. Thus, as shown in FIG. 3, an unexpected sample tube cap 166 transported on the sample transport device 118 may be identified.

Figure 4:
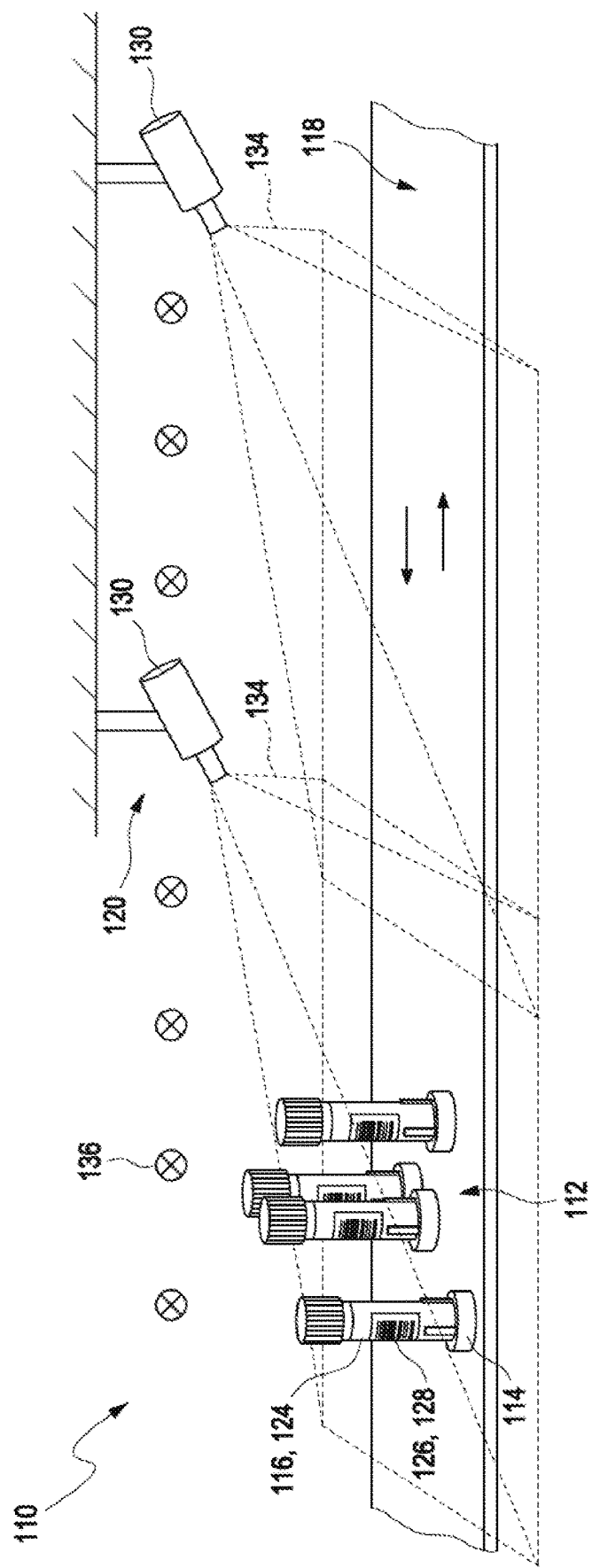
FIG. 4 illustrates a sample handling system according to a third embodiment of the present disclosure.
Figure 5:
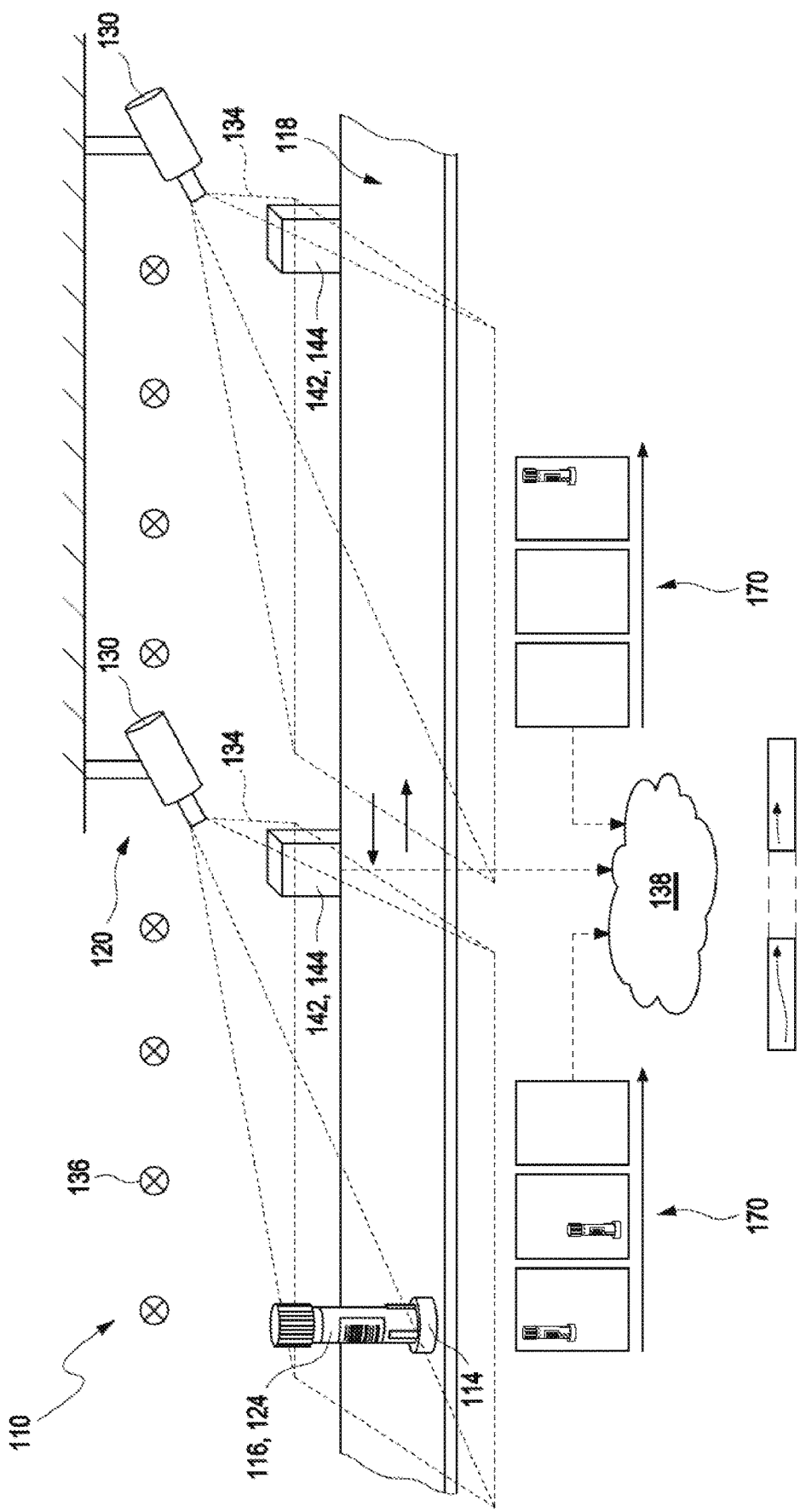
FIG. 5 illustrates a sample handling system according to a fourth embodiment of the present disclosure.
Figure 6:
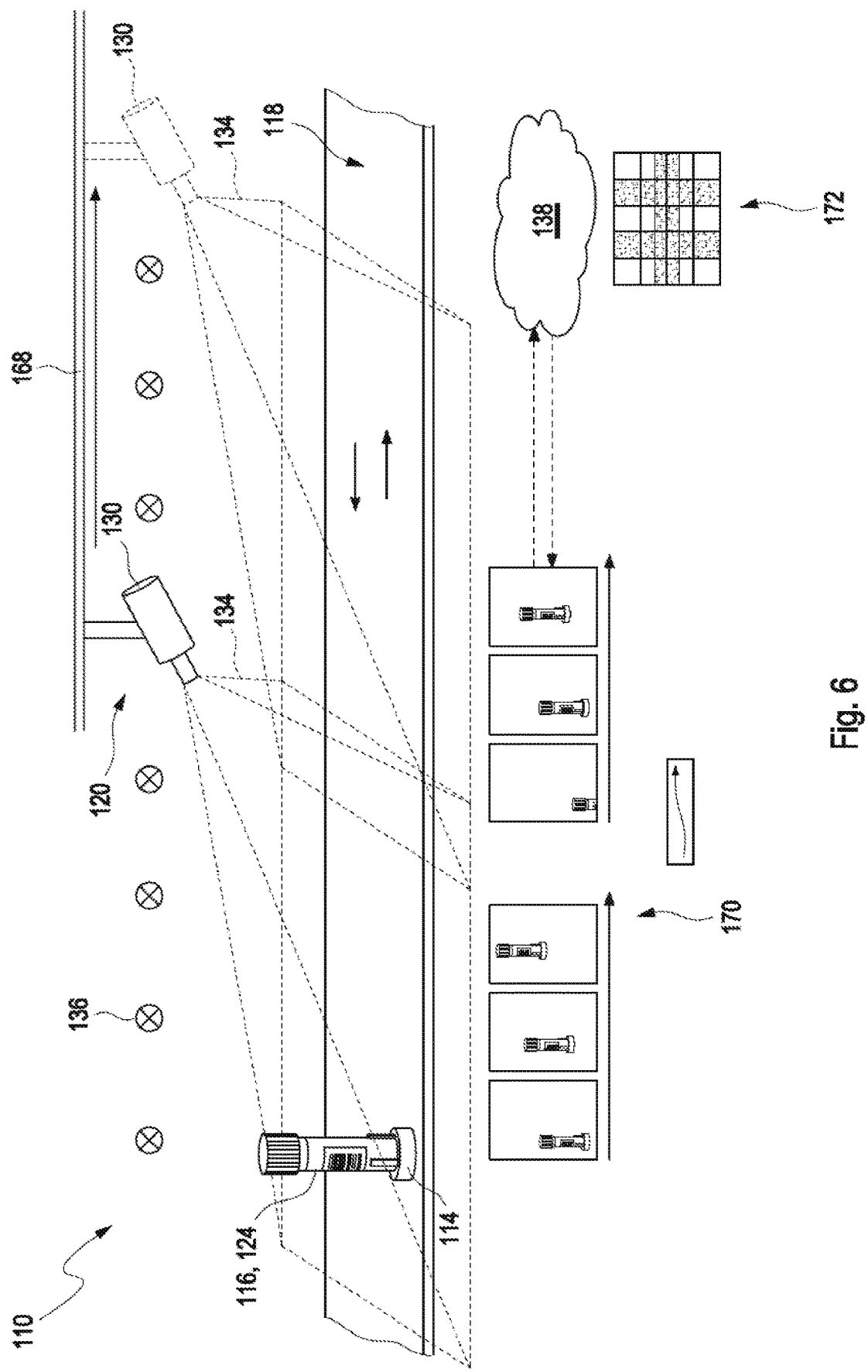
FIG. 6 illustrates a sample handling system according to a fifth embodiment of the present disclosure.

In the FIGS. 4 to 6, further embodiments of the sample handling system 110 are shown in a perspective view. The sample handling system 110 may be widely identical to the first embodiment of the sample handling system 110 in FIG. 1, so reference may be made to the description of FIG. 1 above.

In FIG. 4, the monitoring system 120 may be built up by a high density of permanently mounted camera modules 130 each viewing a certain transport area continuously. All transport surfaces of the sample transport device 118 may be covered by at least one camera module's viewing field 134. Thus, there may be no gap on the sample transport device 118 that cannot be imaged by the at least one camera module 130. This may allow for a total transport monitoring by stitching all images in the cloud server 138 together. The stitching may be performed by using images acquired at the same time or within a time duration shorter than that between two frames taken by the same camera. The stitching may comprise using a registration based on a defined pattern. The registration may comprise one or more of a reference map such as a layout of the sample transport device, a calibration element, specifically for correcting perspective distortion, a registration including 2.5 dimension, specifically a height up to about 30 cm above the transport system may also be of interest, special and potentially time warping based on key reference points, visualization, processing and/or integration of redundant information. The registration may use a random sample consensus (RANSAC) algorithm. By stitching short-distance tracking paths using registration, a long-distance or total-path tracking of the sample can be performed. The stitching can be done before the tracking. The monitoring system 120 can be configured for monitoring the entire sample transport device 118 in a huge image-map over time, such as a video. Thus, the trajectory of each sample can be tracked directly end-to-end in the total video, instead of stitching short-distance tracks detected by every camera.

In FIG. 5, the monitoring system 120 may be built up by a moderate density of permanently mounted camera modules 130. In this case, the viewing fields 134 of the plurality of camera modules 130 may not be stitched gapless. By combining the short-distance tracks of a sample with the same ID, the paths of the samples on the sample transport device 118 that cannot be monitored, may be interpolated. By comparing the features and status of the sample in different fields of views 134, irregularity and errors that may not be cached by one camera module 130 directly, may still be detected. In the case that sample ID cannot be detected well, the assignment of the samples when it appears for the first time in the field of view 134 of a camera module 130 may be performed by combining the images of the last camera module, specifically, features of the sample derived therefrom, and LIS or further connected routing software modules route planning information, specifically, a direction, a speed and/or a predicted position of the sample. The LIS or further software modules connected to the LIS may know the sample ID, the planned track and destination, or even the tracking (e.g., transport managing system) of the transport system itself. The stitching of images is indicated in FIG. 6, as is denoted by reference number 170.

In FIG. 6, the monitoring system 120 may be built up by a one or more camera modules 130 that constantly changing their perspectives by moving and turning and/or zooming. This may allow the installation of a moderate and/or a low number of camera modules 130 but can still allow monitoring the sample transport device 118. The installation of movable camera modules 130 may reduce the frequency that a certain area has to be imaged but may still cover the monitoring of the entire sample transport device 118 without gaps. For example, the sample handling system 110 may further comprise at least one guiding rail 168, wherein the at least one camera module 130 may be movable along the guiding rail 168. Further, short-distance tracking might not be possible. By stitching the images 170 over time and distance, long-distance tracking may be possible by combining the images captured by the camera module 130 and further at least one space and time information, the sample ID and at least one route planning information of each sample. The image stitching for a complete map of the track of a sample 172 may be performed by the cloud server 138.

Figure 7:
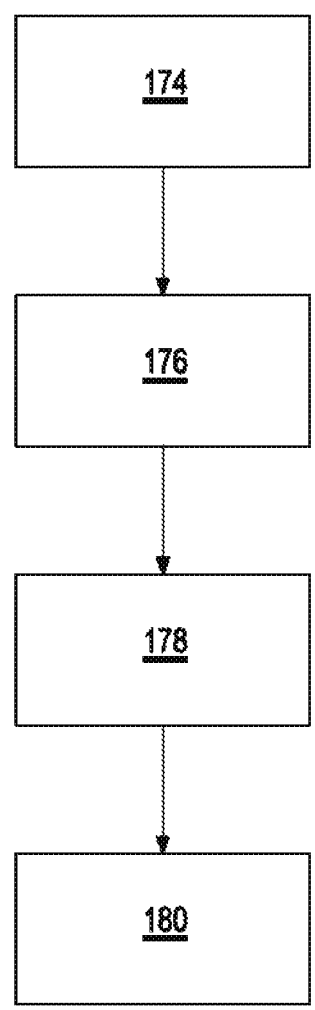
FIG. 7 illustrates a flow chart of a method for handling a plurality of samples according to an embodiment of the present disclosure.

In FIG. 7, an exemplary embodiment of a flow chart of a method for handling a plurality of samples is shown. In the method, at least one sample handling system 110 according to any of embodiments shown in FIG. 1, 2, 4, 5 or 6 may be used.

The method comprises the following steps, which may specifically be performed in the given order. Still, a different order may also be possible. It may be possible to perform two or more of the method steps fully or partially simultaneously. It may further be possible to perform one, more than one or even all of the method steps once or repeatedly. The method may comprise additional method steps that may not be listed.

The method can comprises a) (denoted by reference number 174) receiving the at least one sample container 116 in the at least one sample holder 114, b) (denoted by reference number 176) moving the at least one sample container 116 in the sample holder 114 by using the at least one sample transport device 118, c) (denoted by reference number 178) monitoring the plurality of samples during movement via the sample transport device 118 by using the at least one monitoring system 120, wherein the monitoring system 120 can comprise capturing images of at least a part of the sample transport device 118 by using the at least one camera module 130 of the monitoring system 120 and processing the captured images by using the at least one processor 132 of the monitoring system 120, thereby determining at least one item of information about the sample transport device 118 and/or the sample container 114 and/or the sample from the captured images; and d) (denoted by reference number 180) retrieving the item of information from the processor 132 by the at least one control unit 121 and controlling a functionality of the sample handling system 110 based on the retrieved item of information.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A sample handling system for handling a plurality of samples, the sample handling system comprising:
    a plurality of sample holders, each configured for receiving a sample container; at least one sample transport device configured for moving the plurality of sample holders in at least one direction, the at least one sample transport device comprising a multilane sample transport system;
    at least one monitoring system configured for monitoring the plurality of samples during movement via the at least one sample transport device, wherein the at least one monitoring system comprises
    at least one camera module configured for continuously capturing images of at least a part of the sample transport device, wherein the at least one camera module is arranged at a distance away from the at least one sample transport device such that the at least one camera module has a free field of view to the at least one sample transport device, and
    at least one processor, wherein the at least one processor is configured for processing the captured images and determining at least one item of information about the at least one sample transport device and/or the sample container and/or the sample from the captured images;
    wherein the sample handling system further comprises at least one cloud server, wherein the monitoring system comprises a high density of permanently mounted camera modules each viewing a certain transport area continuously, wherein all transport surfaces are covered by at least one camera module's viewing field, such that there is no gap on the sample transport device that is not imaged such that a total transport monitoring is configured to be performed by stitching all images captured by the plurality of camera modules in the cloud server together, or
    wherein the monitoring system comprises a moderate density of permanently mounted camera modules wherein by combining short-distance tracks of a sample with the same ID, paths that are not monitored can be interpolated, and
    at least one control unit configured for controlling a functionality of the sample handling system, wherein the at least one control unit is configured for retrieving the at least one item of information from the at least one processor, wherein the controlling is based on the retrieved item of information.

2. The sample handling system according to claim 1, wherein the at least one item of information comprises at least one item of information selected from the group comprising: an item of loading information providing information on a loading status of the at least one sample holder; an item of status information providing information on a status of the sample container; a capping status of the sample container, a shape status of the sample container; a sample issue status of the sample container; an item of tracking information providing information on a track of motion of the sample container; an item of motion information providing information on a speed and/or an acceleration of the motion of the sample container; an item of density information providing information on the density of sample holders moved by the sample transport device; an item of event information providing information about an event; an accident of sample holders; and a spilling of a sample.

3. The sample handling system according to claim 1, wherein the at least one camera module comprises at least one monochrome or polychrome camera.

4. The sample handling system according to claim 1, wherein the at least one camera module captures images in a frequency depending on a sample moving speed.

5. The sample handling system according to claim 4, wherein the at least one camera module captures images in a frequency above 1 Hz.

6. The sample handling system according to claim 1, wherein the at least one camera module comprises a plurality of cameras.

7. The sample handling system according to claim 6, wherein the at least one camera module comprises a high density of moderate density of permanently mounted cameras, each camera viewing a certain transport area continuously.

8. The sample handling system according to claim 6, wherein the cameras are configured for constantly changing their perspectives by moving and turning and/or zooming.

9. The sample handling system according to claim 1, wherein the at least one processor is configured for sample detection in real time.

10. The sample handling system according to claim 1, wherein the processing of the captured images comprises using of at least one object detection algorithm.

11. The sample handling system according to claim 1, wherein the processing of the captured images comprises one or more of pattern matching, machine learning methods, deep learning methods, and at least one You Only Look Once (YOLO) real-time object detection algorithm.

12. The sample handling system according to claim 1, wherein the at least one monitoring system is configured for unidirectional or bidirectional exchange of the item of information with the control unit.

13. The sample handling system according to claim 1, wherein the at least one monitoring system is configured for unidirectional or bidirectional exchange of the item of information with the cloud server.

14. The sample handling system according to claim 1, wherein the sample container comprises at least one identifier.

15. The sample handling system according to claim 14, wherein the identifier identifies the sample comprised by the sample container.

16. The sample handling system according to claim 14, wherein the at least one identifier comprises at least one of: an optical identifier and an electronic identifier.

17. The sample handling system according to claim 16, further comprising:
   at least one reading device comprising at least one of: an optical reading device, and
   a radio-frequency reading device.

18. A method for handling a plurality of samples, wherein in the method at least one sample handling system according to claim 1 is used, the method comprising:
   a. receiving at least one sample container in at least one sample holder;
   b. moving the at least one sample container in the at least one sample holder by using at least one sample transport device;
   c. monitoring the plurality of samples during movement via the at least one sample transport device by using at least one monitoring system, wherein the at least one monitoring system comprises capturing images of at least a part of the sample transport device by using at least one camera module of the at least one monitoring system and processing the captured images by using at least one processor of the at least one monitoring system, thereby determining at least one item of information about the sample transport device and/or the sample container and/or the sample from the captured images; and
   d. retrieving the item of information from the at least one processor by at least one centralized unit and controlling a functionality of the sample handling system based on the retrieved item of information.

19. A computer program comprising instructions, which when the program is executed by the sample handling system according to claim 1, cause the sample handling system to carry out at least steps a. to d. of the method according to claim 18.

20. The sample handling system according to claim 16, wherein the at least one optical identifier is a barcode and/or a QR-code, and the electronic identifier is an RFID or an NFC tag.

21. The sample handling system of claim 20, wherein the at least one optical identifier is a bar code and the reading device comprises a barcode reader and/or the at least one identifier is an RFID tag or an NFC tag, and the reading device is an RFID or an NFC reader.

22. The sample handling system of claim 1 wherein the monitoring system comprises a high density of permanently mounted camera modules each viewing a certain transport area continuously, wherein all transport surfaces are covered by at least one camera module's viewing field, such that there is no gap on the sample transport device that is not imaged such that a total transport monitoring can be performed by stitching all images captured by the plurality of camera modules in the cloud server together.

23. The sample handling system of claim 1 wherein the monitoring system comprises a moderate density of permanently mounted camera modules wherein by combining short-distance tracks of a sample with the same ID, paths that are not monitored can be interpolated.

24. The sample handling system of claim 1 wherein the plurality of sample holders are arranged in parallel in a common plane or in different planes.

25. A sample handling system for handling a plurality of samples, the sample handling system comprising:
   a plurality of sample holders, each sample holder receiving a sample container;
   at least one sample transport device moving the plurality of sample holders in at least one direction, the at least one sample transport device comprising a multilane sample transport system;
   at least one monitoring system monitoring the plurality of samples during movement via the at least one sample transport device, wherein the at least one monitoring system comprises
   at least one camera module configured for continuously capturing images of at least a part of the sample transport device, wherein the at least one camera module is arranged at a distance away from the at least one sample transport device such that the at least one camera module has a free field of view to the at least one sample transport device, and
   at least one processor, wherein the at least one processor is configured for processing the captured images and determining at least one item of information about the at least one sample transport device and/or the sample container and/or the sample from the captured images; and
   at least one control unit controlling a functionality of the sample handling system, wherein the at least one control unit retrieves the at least one item of information from the at least one processor, wherein the controlling is based on the retrieved item of information.

\* \* \* \* \*